US010649801B2

(12) United States Patent
Gabrielson et al.

(10) Patent No.: US 10,649,801 B2
(45) Date of Patent: May 12, 2020

(54) VIRTUAL MACHINE BASED CONTENT PROCESSING

(71) Applicant: Amazon Technologies, Inc., Reno, NV (US)

(72) Inventors: Jacob Gabrielson, Seattle, WA (US); Piragash Velummylum, Seattle, WA (US); Bradley E. Marshall, Seattle, WA (US); Jonathan B. Corley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 15/876,932

(22) Filed: Jan. 22, 2018

(65) Prior Publication Data

US 2018/0196690 A1    Jul. 12, 2018

Related U.S. Application Data

(63) Continuation of application No. 14/992,891, filed on Jan. 11, 2016, now Pat. No. 9,875,134, which is a
(Continued)

(51) Int. Cl.
*G06F 9/455* (2018.01)
*H04L 29/08* (2006.01)
(Continued)

(52) U.S. Cl.
CPC .......... *G06F 9/45558* (2013.01); *H04L 67/10* (2013.01); *H04N 21/25435* (2013.01);
(Continued)

(58) Field of Classification Search
None
See application file for complete search history.

(56) References Cited

U.S. PATENT DOCUMENTS 5,555,295 A * 9/1996 Bhusri .................... H04M 3/36
379/111
6,496,847 B1 * 12/2002 Bugnion ............. G06F 9/45533
703/21
(Continued)

OTHER PUBLICATIONS

Tewodros Deneke, Scalable Distributed Video Transcoding Architecture, Master of Science Thesis, Abo Akademi University, Sep. 2011.
(Continued)

*Primary Examiner* — William J. Goodchild
(74) *Attorney, Agent, or Firm* — Hogan Lovells US LLP

(57) ABSTRACT

A set of techniques is described for enabling a virtual machine based transcoding system. The system enables any transcoding provider to make their transcoding service available to other users over a network. The system can automate the deployment, execution and delivery of the transcoding service on behalf of the transcoding provider and enable other users to use the transcoding services to transcode content. The system receives a virtual machine image, transfers the image to a location where the media content is stored and creates a virtual private network of resources that will perform the transcoding of the media content. The virtual private network may be firewalled or otherwise restricted from opening connections with external clients when transcoding the content in order to prevent malicious use of the media content.

20 Claims, 5 Drawing Sheets

Related U.S. Application Data continuation of application No. 13/476,987, filed on May 21, 2012, now Pat. No. 9,237,188.

(51) Int. Cl.
   *H04N 21/2543*   (2011.01)
   *H04N 21/4402*   (2011.01)
   *H04N 21/443*    (2011.01)
   *H04N 21/2343*   (2011.01)
   *H04L 29/06*     (2006.01)

(52) U.S. Cl.
   CPC . *H04N 21/4437* (2013.01); *H04N 21/440218* (2013.01); *G06F 2009/4557* (2013.01); *G06F 2009/45591* (2013.01); *G06F 2009/45595* (2013.01); *H04L 63/0272* (2013.01); *H04N 21/2343* (2013.01)

(56) References Cited

U.S. PATENT DOCUMENTS

| | | | |
|---|---|---|---|
| 7,356,679 B1 | 4/2008 | Le | |
| 7,603,670 B1* | 10/2009 | van Rietschote | G06F 9/4856 718/1 |
| 7,793,338 B1* | 9/2010 | Beddoe | H04L 63/1491 726/22 |
| 7,877,786 B2* | 1/2011 | van Bemmel | H04L 63/0209 726/1 |
| 8,266,290 B2* | 9/2012 | Calder | G06F 9/546 709/206 |
| 8,589,203 B1* | 11/2013 | Collins | G06Q 10/00 705/7.12 |
| 8,601,158 B2* | 12/2013 | Holland | G06F 9/45533 709/238 |
| 9,237,188 B1* | 1/2016 | Gabrielson | H04L 67/10 |
| 2002/0047899 A1* | 4/2002 | Son | H04L 12/2801 348/114 |
| 2002/0156826 A1* | 10/2002 | Bentz | G06F 11/1441 709/201 |
| 2003/0021280 A1* | 1/2003 | Makinson | H04L 63/0209 370/401 |
| 2003/0033301 A1* | 2/2003 | Cheng | G06Q 10/02 |
| 2003/0055529 A1* | 3/2003 | Aosawa | H04L 41/0883 700/220 |
| 2004/0117640 A1* | 6/2004 | Chu | G06F 21/554 713/188 |
| 2005/0097169 A1* | 5/2005 | Mukherjee | G09B 5/06 709/204 |
| 2005/0198303 A1* | 9/2005 | Knauerhase | G06F 9/5055 709/227 |
| 2005/0234846 A1* | 10/2005 | Davidson | G06F 9/4416 |
| 2006/0218651 A1* | 9/2006 | Ginter | G06F 21/00 726/27 |
| 2007/0050767 A1* | 3/2007 | Grobman | G06F 9/45558 718/1 |
| 2007/0174853 A1 | 7/2007 | Turk | |
| 2007/0204153 A1* | 8/2007 | Tome | H04L 63/0272 713/164 |
| 2007/0204166 A1* | 8/2007 | Tome | H04L 63/0272 713/182 |
| 2007/0220565 A1* | 9/2007 | Angel | G06Q 10/087 725/87 |
| 2007/0300221 A1* | 12/2007 | Hartz | G06F 3/1222 718/1 |
| 2008/0222234 A1* | 9/2008 | Marchand | H04L 12/1877 709/201 |
| 2008/0235158 A1* | 9/2008 | Manchala | G06Q 10/06316 705/400 |
| 2008/0313302 A1* | 12/2008 | Heyworth | G06F 16/40 709/217 |
| 2009/0080408 A1* | 3/2009 | Natoli | H04L 45/00 370/351 |
| 2009/0172781 A1* | 7/2009 | Masuoka | H04L 63/105 726/3 |
| 2009/0193074 A1* | 7/2009 | Lee | G06F 21/51 709/203 |
| 2009/0259759 A1* | 10/2009 | Miyajima | H04L 63/0272 709/229 |
| 2009/0276771 A1* | 11/2009 | Nickolov | G06F 9/4856 717/177 |
| 2009/0288084 A1* | 11/2009 | Astete | G06F 9/45533 718/1 |
| 2009/0327517 A1* | 12/2009 | Sivasubramanian | H04L 29/12132 709/238 |
| 2009/0328122 A1* | 12/2009 | Amento | H04N 7/17318 725/114 |
| 2010/0228819 A1 | 9/2010 | Wei | |
| 2011/0022812 A1 | 1/2011 | van der Linden | |
| 2011/0107406 A1* | 5/2011 | Frost | G06F 9/45558 726/6 |
| 2011/0161952 A1* | 6/2011 | Poddar | G06F 16/583 717/173 |
| 2011/0258622 A1* | 10/2011 | Burckart | G06F 8/65 718/1 |
| 2011/0261828 A1* | 10/2011 | Smith | H04L 12/462 370/401 |
| 2011/0279634 A1* | 11/2011 | Periyannan | H04N 7/141 348/14.09 |
| 2011/0302580 A1* | 12/2011 | Iikura | G06F 8/63 718/1 |
| 2012/0011509 A1* | 1/2012 | Husain | G06F 9/5088 718/1 |
| 2012/0102154 A1* | 4/2012 | Huang | H04L 65/605 709/219 |
| 2012/0110055 A1 | 5/2012 | Van Biljon | |
| 2012/0117242 A1* | 5/2012 | Aoki | G06F 9/5072 709/226 |
| 2012/0131591 A1 | 5/2012 | Moorthi | |
| 2012/0166623 A1 | 6/2012 | Suit | |
| 2013/0064285 A1* | 3/2013 | Karlsson | H04N 21/2181 375/240.02 |
| 2013/0086298 A1 | 4/2013 | Alanis | |
| 2013/0091501 A1 | 4/2013 | Barabash | |
| 2013/0104126 A1* | 4/2013 | Padmanabhuni | G06F 9/45558 718/1 |
| 2013/0125120 A1 | 5/2013 | Zhang | |
| 2013/0263131 A1* | 10/2013 | Beda, III | G06F 8/63 718/1 |
| 2013/0263269 A1* | 10/2013 | Palumbo | G06F 8/65 726/24 |
| 2013/0268643 A1 | 10/2013 | Chang | |
| 2014/0006858 A1 | 1/2014 | Helfman | |
| 2014/0007086 A1 | 1/2014 | Ross | |
| 2014/0020072 A1 | 1/2014 | Thomas | |
| 2014/0047440 A1 | 2/2014 | Da Silva | |
| 2014/0059380 A1* | 2/2014 | Krishnan | G06F 11/1415 714/15 |
| 2014/0059546 A1* | 2/2014 | Holland | G06F 9/45533 718/1 |
| 2014/0122672 A1 | 5/2014 | Chen | |
| 2014/0189686 A1 | 7/2014 | Masters | |
| 2014/0283077 A1* | 9/2014 | Gallella | G06F 21/53 726/24 |
| 2015/0058461 A1 | 2/2015 | Guiditta | |
| 2016/0124767 A1* | 5/2016 | Gabrielson | H04L 67/10 718/1 |

OTHER PUBLICATIONS

Gong et al., PRESS: PRedictive Elastic ReSource Scaling for cloud systems, Proc. 6 IEEE/IFIP International Conference on Network and Service Management, CNSM, Oct. 2010.

Pfleeger, "Security in Computing", $2^{nd}$ Edition, ISBN 0-13-337486-6, 1996.

Notice of Allowance issued in U.S. Appl. No. 13/476,987 dated Sep. 17, 2015.

Non-Final Rejection issued in U.S. Appl. No. 13/476,987 dated Jan. 2, 2015.

(56) References Cited

OTHER PUBLICATIONS

Notice of Allowance issued in U.S. Appl. No. 14/992,891 dated Sep. 25, 2017.

* cited by examiner

VIRTUAL MACHINE BASED CONTENT PROCESSING

CROSS-REFERENCES TO RELATED APPLICATIONS

This application is a continuation of U.S. application Ser. No. 14/992,891, filed Jan. 11, 2016, which is a continuation of U.S. application Ser. No. 13/476,987, now U.S. Pat. No. 9,237,188, filed May 21, 2012; both entitled "VIRTUAL MACHINE BASED CONTENT PROCESSING," which are incorporated herein by reference for all purposes.

BACKGROUND

Over the last several decades, the cost of computer memory, storage and processors has been steadily declining, while the power and performance of such devices have been increasing at a relatively rapid pace. As a result, a given amount of memory (e.g. DRAM) today costs substantially less to a consumer than what the same amount would have cost just a few years ago. Many experts expect this trend to continue, at least in the near future. Wide Area Network (WAN) traffic costs, however, have not shown the same rapid decline in pricing and increase in performance as computer processing and storage. For a variety of reasons, communications over WANs, such as the Internet, have been slower to advance in real terms and thus are often the source of bottlenecks in performance for many systems.

Today, an ever increasing number of applications and services are being made available over networks such as the Internet. Many content, application, and/or service providers are turning to technologies such as remote resource sharing and cloud computing. Cloud computing is a general term often used to describe the process of providing access to electronic resources through services, such as Web services, where the hardware and/or software used to support those services is made to be dynamically scalable to meet the needs of the services at any given time. A user or customer typically will rent, lease, or otherwise pay for access to resources through the cloud, and thus does not have to purchase and maintain the hardware and/or software to provide access to these resources. A service provider that owns those resources will usually take on the responsibility of maintaining and managing the resources, ensuring that they are highly available, scalable and otherwise ready to provide the necessary services.

In such cloud environments, users frequently want their data transformed in some specified way. In light of the slower advancements of network communications mentioned above, moving large amounts of raw data across network connections is not always ideal and may take longer than what can be tolerated by many systems. There is currently no solution for transforming data that takes advantage of cloud computing and virtual machines, while at the same time reducing the amount of data that needs to be delivered over a WAN.

BRIEF DESCRIPTION OF THE DRAWINGS

Various embodiments in accordance with the present disclosure will be described with reference to the drawings, in which.

DETAILED DESCRIPTION

Figure 1:
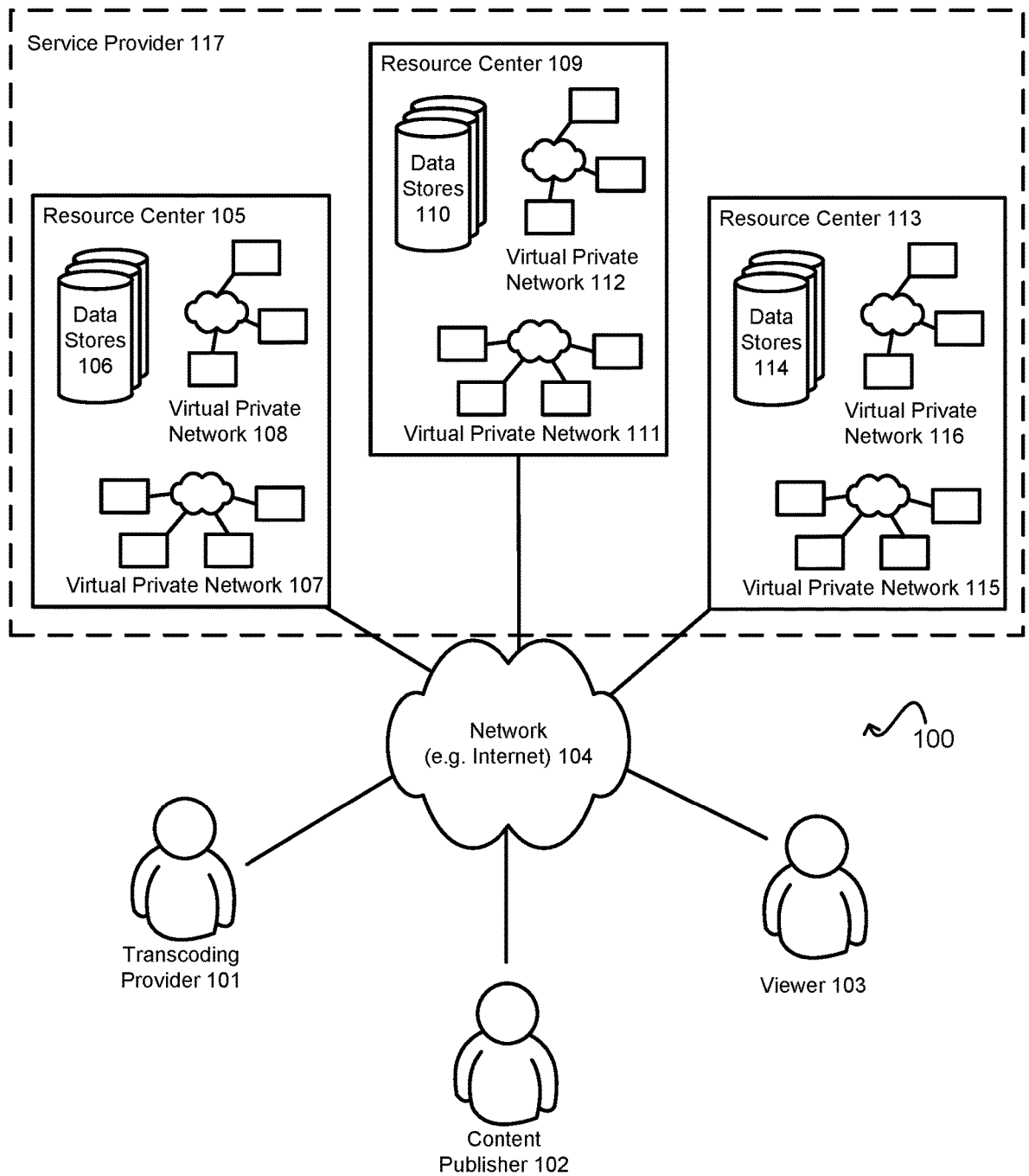
FIG. 1 is an illustration of the environment in which virtual machine based transcoding can be provided in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for transcoding, transforming and/or otherwise processing content. In particular, various embodiments provide approaches for using virtual machines and/or virtual networks for transcoding and processing content in a multi-tenant networking and computing environment.

In accordance with various embodiments, a virtual machine based transcoding system is described that enables any transcoding provider (or other user that wishes to offer their content processing algorithms) to make their transcoding service available to other users over a network, such as the Internet. The system can automate the deployment, execution and delivery of the transcoding service on behalf of the transcoding provider and enable other users (e.g. content publishers, etc.) to use the transcoding services to transcode and/or otherwise process their content (e.g. audio, video, multimedia, and other data). For example, the system may allow a content publisher, such as a content creator, owner or distributor to upload (or otherwise provide) their media content to a specified location, and request that transcoding be performed. In various embodiments, the virtual machine based transcoding system can be provided by a service provider (e.g. cloud computing provider) in a multi-tenant computing environment (e.g. cloud computing environment).

In accordance with an embodiment, the transcoding provider provides a complete virtual machine image to the system. The virtual machine image can include a combination of an operating system and other software resources that will be instantiated by the system to perform the transcoding. In one embodiment, the virtual machine image includes all of the necessary resources to perform the transcoding and does not rely on establishing any network connections to any external entities.

Once the virtual machine image is received, the service provider may enable content publishers to request to use the transcoding service contained in the machine image on their media that the system might be storing. In accordance with an embodiment, once the system receives a request to transcode a set of content, such as media content, the system can first transfer the virtual machine image to the location where that media content is stored. Because the media content is often substantially larger in size than the virtual machine image, it can be advantageous to transmit the code to the data rather than the other way around.

In accordance with an embodiment, once the virtual machine image is transferred to the location of the media content, the system can create a virtual private network that includes one or more compute instances or other resources for performing the transcoding of media or other content. In one embodiment, the virtual private network can be firewalled off from initiating connections with any external clients in order to prevent any potentially malicious users posing as legitimate transcoding providers from compromising the security or digital rights associated with the media content. Because the virtual network is effectively disconnected from external entities, the only malicious action that can be possibly taken by the transcoding service is to return corrupted data, which can be readily detected by the owner of the media content. In accordance with one embodiment, this restriction of access implies that the virtual private network should not rely on any external libraries or other services in order to perform its functions. In addition, the firewall can restrict access from external entities to the compute instances inside the virtual private network in order to prevent any theft or other malicious acts on the resources contained inside the virtual private network. In this manner, the content publisher is not allowed to steal the transcoding algorithms or code from the virtual private network, while still being able to utilize those transcoding algorithms on its content.

In accordance with an embodiment, the virtual network is configured to listen on a port using a standard protocol connection (e.g. HTTP server listening on port 80) which may have been agreed upon in advance between the service provider and the transcoding provider. This allows the content publisher to provide its media content to the virtual network in order to carry out the transcoding. The virtual network can allow data to be posted in a predetermined location (e.g. specific file directory), along with appropriate metadata that indicates the source and destination formats. These formats will be used by the virtual network to transcode the media content. In at least one embodiment, the media content can be streamed into the virtual network and the virtual network can stream transcoded content in response to another predetermined location.

In accordance with various embodiments, the content publisher may simply select which transcoding algorithms makes sense for their business and then invoke an interface (e.g. an application programming interface (API)) to specify when a set of content needs to be transcoded. The interface can take into account where the data is located and what kind of transformation or transcoding is being requested.

In accordance with various embodiments, the service provider may implement a billing service that computes the charges (e.g. price per megabyte) for any customer that wishes to utilize the transcoding service. Customers can also be allowed to rate the quality of transcoding performed by the transcoding service. In some embodiments, the transcoding provider may also be charged a fee for utilizing the resources of the service provider (e.g. cloud computing provider) to carry out the transcoding of data.

It should be noted that although the various portions of this disclosure refer to examples of transcoding media content, this is not a necessary limitation to all of the embodiments described herein. In various alternative embodiments, the principles and embodiments mentioned herein may be applied to any type of transforming and other processing of content, including but not limited to data mining or analysis, image recognition, transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner.

FIG. 1 is an illustration of the environment 100 in which virtual machine based transcoding can be provided in accordance with various embodiments.

In the illustrated embodiment, a service provider 117 maintains a number of resource centers (105, 109, 113) which may be geographically distributed. The resource centers (105, 109, 113) may include any data center, server farm, content delivery network point-of-presence (POP) or any other location that hosts the various resources of the service provider. In accordance with various embodiments, a resource center may include various computer servers, data storage machines, network devices and other hardware resources necessary to provide services or resources to the clients of the service provider. For example, as shown in FIG. 1, the resources provided may include a number of virtual private networks (107, 108, 111, 112, 115, 116) and data stores (106, 110, 114) which may be used to store media content and other data.

In accordance with various embodiments, the service provider can make these resources available to various transcoding providers 101, content publishers 102, and viewers 103 over a network 104. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, and the like.

In accordance with an embodiment, a content publisher 102 may provide (e.g. upload) a set of media content to a store of the service provider 117 and specify that a particular transcoding or other transforming algorithm be applied to the media content. In various embodiments, a content publisher 102 may be any content creator, content distributor, user generated content publisher, or any other entity that possesses media content and desires to transcode, transform or otherwise process that content. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. In various embodiments, any user or entity that owns a piece of media content may fulfill the role of a content publisher.

In accordance with an embodiment, a transcoding provider 101 may provide a virtual machine image to the service provider 117 and this virtual machine image may be used to instantiate one or more virtual private networks of resources (107, 108, 111, 112, 115, 116) that will perform the transcoding of media. A virtual network can be created on any existing resource center of the service provider by transferring the virtual machine image to that resource center and instantiating all of the resources contained in the image.

In accordance with an embodiment, a virtual machine image is a virtual appliance which can be used to instantiate or create virtual machines on the resource center of the service provider. These virtual machines may be linked or connected to create a virtual network that can be used to perform the various services described herein. As demand for these services grows or shrinks, any number of virtual machines (e.g. compute instances, server instances, etc.) can be added to or removed from the virtual network. In various embodiments, the virtual private network enables a user (e.g. transcoding provider 101) to provision a private, isolated section of the service provider's network where resources (e.g. virtual machines) can be instantiated. In accordance with an embodiment, the user may specify any network topology, including selection of internet protocol (IP) address range, creation of subnets, and configuration of route tables and network gateways.

Figure 2:
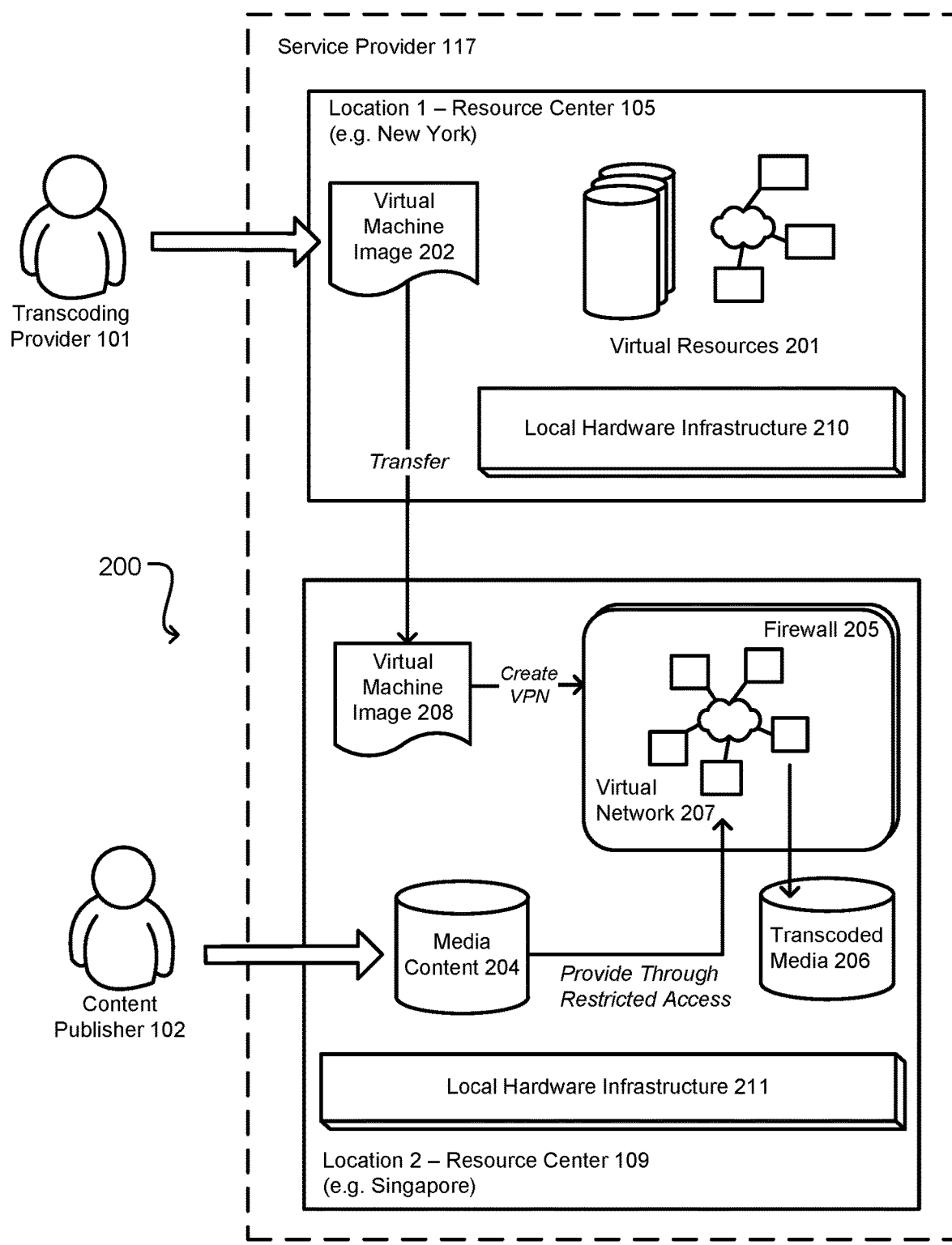
FIG. 2 illustrates an example of a system where a virtual private network is created in the same location as the media content to be transcoded, in accordance with various embodiments.

FIG. 2 illustrates an example of a system 200 where a virtual private network is created in the same location as the media content to be transcoded, in accordance with various embodiments. It should be understood that reference numbers for like components may be carried over between figures for purposes of explanation, but this should not be interpreted as limiting the scope of the various embodiments. Further although transcoding of media content is used in this example, it should be understood that other types of content can be processed using various other processes discussed herein to change a format, version, or other such aspect of the content in accordance with various embodiments.

In the illustrated embodiment, the transcoding provider 101 provides a virtual machine image 202 to a resource center 105 of the service provider 117. The resource center 105 may be located in a particular geographic location, such as New York, N.Y. USA. The resource center 105 may include its local hardware infrastructure 210 that runs the various virtual resources 201 and other software resources provided by the service provider 117.

Furthermore, a different user (e.g. content publisher 102) may provide its media content 204 to the service provider and request to transcode the media content 204 or otherwise transform it in some manner. In various embodiments, the media content may be uploaded in a different resource center 109 located in a remote geographic location from where the virtual machine image is stored. For example, as shown in the illustration, resource center 109 may be located in Singapore, or any other remote destination. In various embodiments, the resource centers in FIG. 2 can be any location having its own local hardware infrastructure 211, such as a data center, server farm, network point-of-presence (POP) and the like. In at least one embodiment, the resource center 105 is remote with respect to the resource center 109 in a sense that they must communicate over a wide area network (WAN) connection, rather than a local area network (LAN) connection. In an alternative embodiment, the resource center 105 is remote with respect to the resource center 109 in that communications within each resource center (intra-center communications) are performed over a different protocol (or are faster by more than a threshold limit) than communications between the resource centers (inter-center communications).

In accordance with an embodiment, rather than transferring the media content (which may be considerably large) between these remote locations, the service provider 117 transfers a copy of the virtual machine image 208 to resource center 109. In accordance with one embodiment, there may be a control service that handles creating the virtual networks and starting up the machine images in the appropriate place.

Once the virtual machine image is received in resource center 109, the service provider may launch the virtual network 207 locally in the same data center as the media content. In accordance with various embodiments, a virtual machine image can serve as a unit of deployment for any service that is desired to be delivered using the resources of the service provider 117. For example, the virtual machine image may be a read-only file system image which includes an operating system (e.g., Linux, UNIX, or Windows) and any additional software used to deliver a service or a portion of a service. In accordance with various embodiments, the file system can be compressed, encrypted, signed, and/or divided into segments, and uploaded into data stores of the service provider for storage. An XML, manifest file may be used to store information about the virtual machine image, including its name, version, architecture, default kernel id, decryption key and digests for all of the segments of the file system.

In accordance with an embodiment, the virtual machine image is used to construct a virtual network 207 of resources, such as virtual machines, server instances, compute instances, or the like. This virtual network will be designated to perform the transcoding (or other processing) of content 204. In an alternative embodiment, rather than constructing a new virtual network, the system may instead select one of the existing virtual networks that is capable of performing the transcoding. For example, the system may select one of the virtual private networks of the transcoding provider 101 that may be running in the resource center 109. In various embodiments, each virtual network on the system may be associated with its owner user (e.g. content publisher, transcoding provider, etc.). In these embodiments, other users are restricted or precluded access from the virtual private network.

In one embodiment, no other entities reside in the virtual network 207 besides the transcoding service specified in the virtual machine image and the virtual network 207 is restricted from any external network connectivity by using a firewall 205. For example, the resources of the virtual network 207 can be prevented from initiating any network connections with external clients over the Internet. As such, no matter how malicious the transcoding virtual machine image is, there is nothing it is allowed to do with the media content other than to send back corrupted data, but this would be detectable by the content publisher 102 or service provider 117. By restricting the virtual network 207 in such a manner, the transcoding provider is precluded from siphoning off data to a side channel, posting the data on the Internet and performing other undesirable actions. In addition, external entities are restricted from accessing the resources inside the virtual network 207. This prevents the content publisher or other malicious users from stealing or corrupting the transcoding algorithm or other information inside the virtual network.

In accordance with an embodiment, the secured nature of the virtual network implies that the virtual machine image 208 does not rely on making any network connections to external entities, such as libraries, web services and the like. Thus, in one embodiment, the virtual machine image is a stand-alone, all-inclusive software package that can be used to start up any number of resource instances for performing the transcoding (or other processing) of content.

In accordance with an embodiment, the virtual network 207 listens on a specified port in a predetermined protocol that has been agreed upon by the service provider 117 and the transcoding provider 101. In one embodiment, the virtual network may not initiate connections and is only allowed to respond to incoming requests. The media content 204 can be provided to (e.g. streamed to) the virtual network 207 over the predetermined port. Alternatively, the content 204 may be posted to a known resource location (directory "/transform") with appropriate meta information indicating the source and destination formats and other information needed to perform the transcoding. Once the virtual network 207 performs the transcoding, it can provide the transcoded media content 206 in response to request. In one embodiment, the virtual network 207 may stream the transcoded content 206 back to a designated recipient, location or the like.

Figure 3:
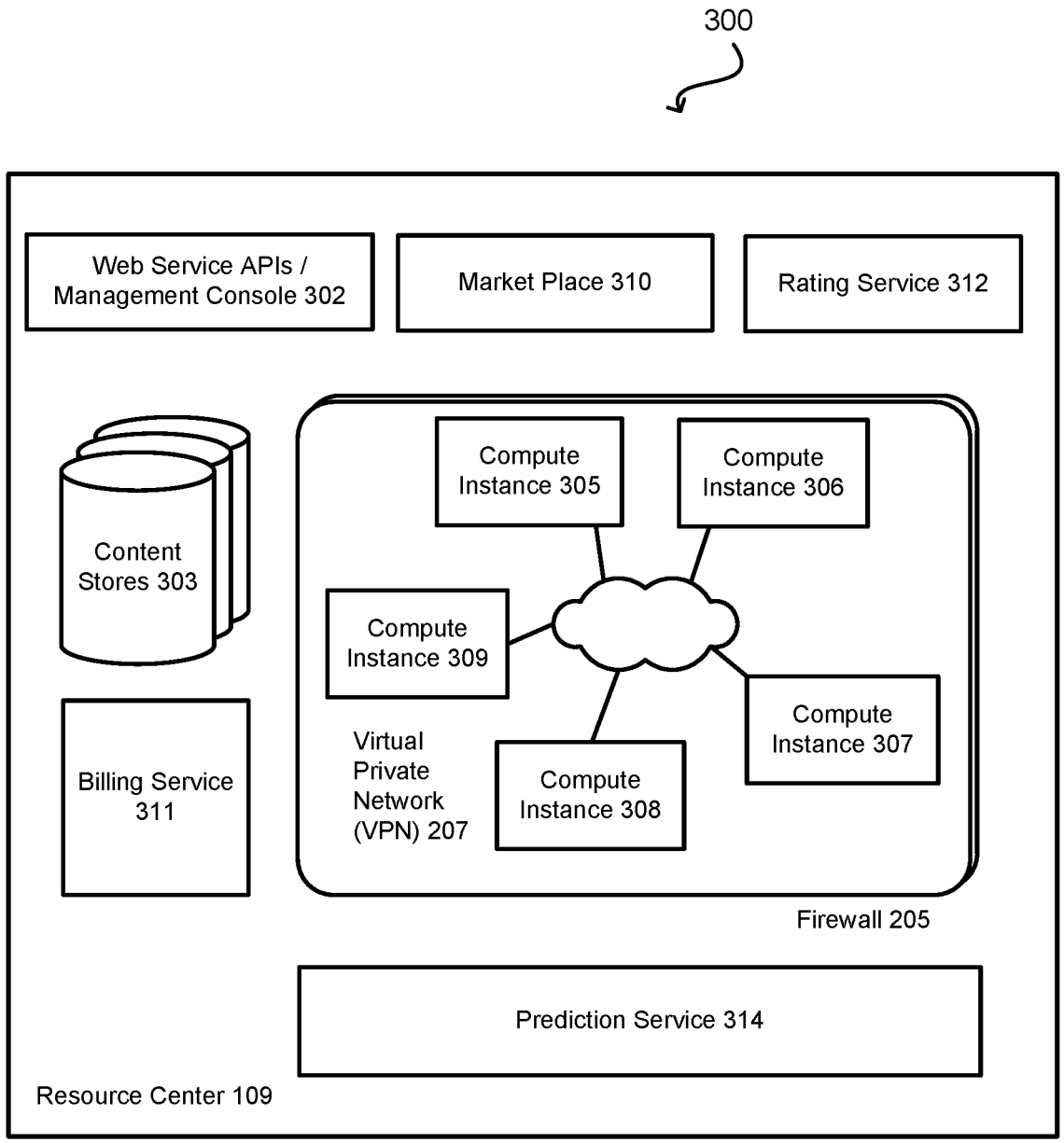
FIG. 3 illustrates an example of several services that may be provided by a service provider in conjunction with virtual machine based transcoding, in accordance with various embodiments.

FIG. 3 illustrates an example of several services 300 that may be provided by a service provider in conjunction with virtual machine based transcoding, in accordance with various embodiments.

In the illustrated embodiment, the virtual private network 207 may be comprised of a plurality of compute instances (305, 306, 307, 308, 309) behind a firewall 205, wherein the compute instances execute a transcoding algorithm provided by the transcoding provider. These compute instances can be managed by the service provider and the number of instances can be automatically scaled up or down according to demand for the transcoding algorithm. In one embodiment, each compute instance is a virtual server resource or virtual machine node having a specific processing capacity and memory associated therewith, which allows the service provider to meter the usage of the transcoding service by each client (e.g. the service provider may charge the transcoding provider per hour of computing resources consumed). In an alternative embodiment, the compute instances can be actual server machines in the resource center 109 maintained by the service provider.

In accordance with an embodiment, the service provider may provide a set of web services application programming interfaces (APIs) or management console 302 to allow content publishers and other users to utilize the virtual machine based transcoding system. For example, a content publisher may provide content to a store 303 of the service provider and use the console or APIs 302 to select which transcoding algorithms (e.g. encoders) are appropriate for their business. Alternatively, this selection can be made by using a configuration file (e.g. XML file), user interface, service calls or any other methods known in the art. Once an encoder is selected, the content publisher may call the API whenever they would like a set of content transcoded. The API may determine where (e.g. which resource center 109) the data is located and what kind of transformation is being requested.

In accordance with an embodiment, the service provider may provide a rating service 312 that enables the various users who have actually used the transcoding system to issue ratings for the different transcoding providers and their individual algorithms. For example, if scaled-down images were being overly pixelated, users may review the transcoding and complain and give it a low numeric rating, which other customers could see. Additionally, the service provider may provide a market place 310 (e.g. similar to an online application store for mobile phone devices) where the various users (e.g. media content owners) may shop and compare the different transcoding providers and their individual services. For example, the market place 310 may display a number of different transcoding algorithms or other content processing services, along with their prices and ratings, in order to enable a user to review, compare and select between the various services. In at least one embodiment, the market place 310 can retrieve the various ratings from the rating service 312 and render them on the interface to select the transcoding algorithms.

In addition to (or in the alternative to) the rating service, the service provider may detect which transcoding providers and/or algorithms have failed most frequently and keep track of such information. This can allow the service provider to shut down those transcoders that are not performing well. For example, if a transcoding algorithm fails to receive the entirety of the input stream, the algorithm may be flagged as potentially malfunctioning. The service provider may then shut down the failing transcoders, contact the transcoding providers, publish the information (e.g. lower rating) to various users, or perform other corrective actions. In some embodiments, the service may also implement pirate detection, where the activity of the virtual machines (or other resources) performing the transcoding are monitored to make sure that they are not attempting to copy information or perform other pirating acts. For example, if the transcoding instances are detected to be simultaneously spooling the media content or performing other unwarranted actions, the transcoding provider may be flagged as being potentially malicious.

In accordance with an embodiment, the service provider may also maintain a billing service 311 that meters the content processed by the virtual network and computes a charge for any user associated transcoding the content based at least in part on the metering of the content processed by the virtual network. For example, the system that transferred the content into the transcoding machine may keep track of the number of bytes sent in. The service provider may then reconcile those bytes with the price established by the transcoding provider and charge the users using the transcoding service on behalf of the transcoding provider. In addition, the service provider may charge the transcoding provider for utilizing the resources (e.g. servers, hardware, etc.) of the service provider. A variety of different charging or billing techniques can be utilized in accordance with the embodiments described herein. For example, the billing service can receive input or instructions regarding the charging from the owner of the transcoding algorithm, and apply the instructions to compute the appropriate charges for the content publishers and other users that utilize those algorithms.

In accordance with an embodiment, the service provider may also deploy a prediction service 314 that estimates a prediction of likely future demand for the transcoding service being provided by the virtual network 207 based at least in part on a history of requests and starts up additional compute instances (or other resources) in the virtual network to match the prediction of likely demand. In various embodiments, the process for instantiating a compute instance may take some time in order to configure and test the instance before allowing it to begin processing content. As such, it may be desirable to pre-instantiate such compute instances and other resources if demand for a particular transcoding algorithm is rapidly increasing. In one embodiment, the prediction service 314 may be deployed and running in the resource center 109 and based on past historical requests, both in aggregate and on a per-customer basis, the prediction service 314 can ensure that enough compute instances and virtual networks remain available within resource center 109 so that future likely demand can be satisfied quickly, rather than instantiating each compute instance upon request (which may otherwise introduce unnecessary latency).

Figure 4:
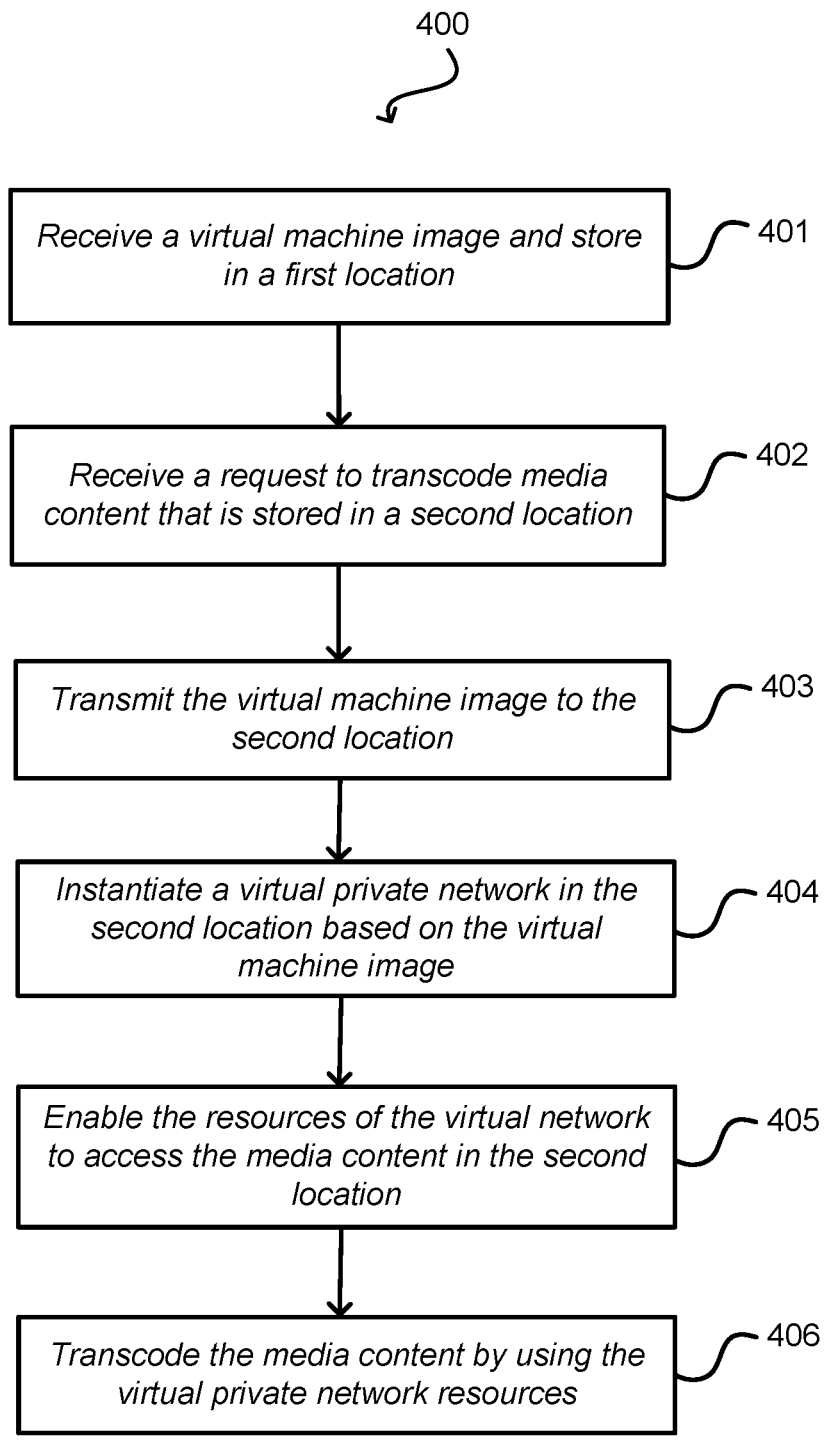
FIG. 4 illustrates an example process for providing virtual machine based transcoding, in accordance with various embodiments.

FIG. 4 illustrates an example process 400 for providing virtual machine based transcoding, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, it should be understood that the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the service provider receives a virtual machine image from a transcoding provider. The virtual machine image may be received in any resource center or location owned by a service provider. In accordance with an embodiment, the virtual machine image contains the operating system and other resources that can be instantiated to perform a transcoding or other processing algorithm on content.

In operation 402, the service provider may receive a request to transcode or otherwise process a set of content (e.g. media content). The media content may be stored in a different resource center or geographic location than the virtual machine image. For example, the transcoding provider may have uploaded the virtual machine image in San Francisco and a content publisher in Hong Kong may wish to employ the transcoding service developed by the transcoding provider on its media stored in Hong Kong.

In operation 403, the service provider transmits the virtual machine image to the location where the media content is stored. Following the example above, the service provider would transfer a copy of the virtual machine image from the resource center in San Francisco to the resource center maintained in Hong Kong. The transfer may take place by any WAN based or other electronic communication, such as file transfer protocol (FTP) or the like.

In operation 404, the service provider instantiates a virtual private network based on the virtual machine image in the same location where the content is stored. Following the example above, the virtual network would be created in the Hong Kong resource center by instantiating a number of compute instances that will be responsible for performing the transcoding of the media content. Alternatively, the system may instead select one of the existing virtual networks that will be used to perform the transcoding. In accordance with some embodiments, the system may perform a cost/benefit analysis to determine whether to utilize an existing virtual network or to create a new virtual network. For example, the system may inspect the availability of existing virtual networks, the size of the media content to be transcoded, the size of the virtual machine image that would need to be transferred, the bandwidth/speed of the network connections, as well as any other variables related to the transcoding job. Based on these or other factors, the system may predict the cost and latency for creating a new virtual network versus using an existing virtual network and determine which option to utilize for transcoding. In one embodiment, the virtual private network is firewalled to restrict any external access from within the virtual network. In this embodiment, the resources of the virtual network are not allowed to open any connections to entities that reside outside of the virtual network, and may only respond to certain requests by performing specific actions.

In operation 405, the service provider enables the resources (e.g. compute instances) of the virtual private network to access the content stored in the resource center. Following the example above, the new virtual network would be allowed to access the media content of the Hong Kong publisher in order to transcode the media content. The content may be streamed into the virtual private network or posted in a designated location for transcoding content.

In operation 406, the resources of the virtual private network transcode (or otherwise process) the content. For example, the media content may be transcoded from H.264 format to MPEG-4 format or the like. Some examples of the various media formats may include but are not limited to H.264/MPEG-4 AVC, M-JPEG, MPEG-4, OGG-Theora, VP8-WebM, VC1 (SMPTE), as well as any other media formats and encodings that are known in the art. In accordance with an embodiment, once the media content has been transcoded, it can be returned by the virtual network in response to an appropriate request. In one embodiment, the transcoded content may be streamed while it is being transcoded.

Figure 5:
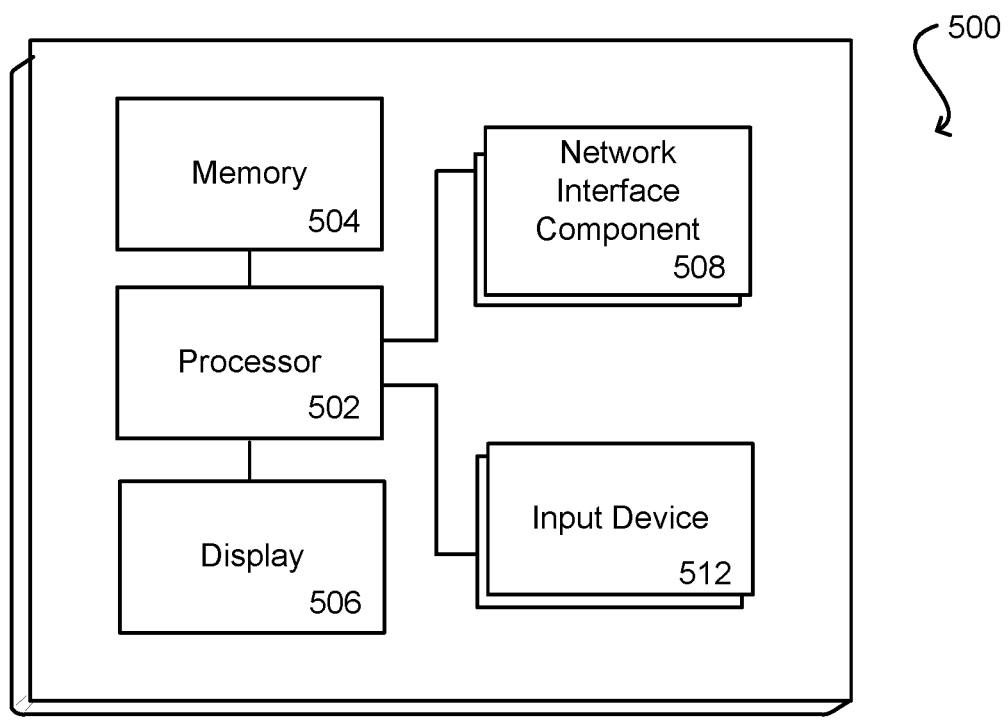
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 512 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for providing virtual machine based transcoding, said method comprising:
    obtaining a request to transcode media content stored in a resource center;
    determining, by a computer system, a prediction of transcoding for one or more compute instances based at least in part on a history of requests for processing the media content;
    determining that a transcoding of the media content into one or more formats by the one or more compute instances matches the prediction of transcoding;
    causing, by the computer system, a virtual machine image to be stored on the resource center, the virtual machine image including at least an operating system and information for configuring the one or more compute instances;
    initiating the one or more compute instances to access the media content stored in the resource center based at least in part on the virtual machine image; and
    causing the media content to be transcoded from a first format into a second format by the one or more compute instances in the resource center, the second format determined based at least in part on the prediction of transcoding and the one or more compute instances.

2. The computer implemented method of claim 1, further comprising:

identifying, by the computer system, a provider associated with the processing algorithm to process the content on the virtual machine;

determining a provider rating associated with the provider, the provider rating included in the display information; and storing the provider rating.

3. The computer implemented method of claim 1, further comprising:

requesting performance data associated with the processing algorithm;

storing the performance data;

updating the processing rating based at least in part on the performance data; and transmitting the performance data for display with the updated processing rating.

4. The computer implemented method of claim 1, further comprising:

selecting a set of providers based at least in part on the request, and for each provider:

providing a provider rating associated with each provider;

identifying at least one processing algorithm provided by each provider; and determining at least one processing rating associated with the at least one processing algorithm;

providing the set of providers for display; and obtaining, from a computing device, a selection for a selected processing algorithm identified in the set of providers.

5. The computer implemented method of claim 4, further comprising processing the content using the selected processing algorithm, wherein the selected processing algorithm processes the content on the virtual machine by transcoding the content from the first format to the second format.

6. The computer implemented method of claim 1, further comprising:

comparing the second format to the first format; and calculating the error information based at least in part on comparing the second format of the content to the first format.

7. The computer implemented method of claim 1, further comprising:

instantiating a virtual private network of the one or more compute instances based at least in part on the virtual machine image; and restricting access between the one or more compute instances of the virtual private network and one or more external clients outside of the virtual private network based at least in part on the virtual machine image.

8. The computer implemented method of claim 7, further comprising:

selecting at least one virtual network of a plurality of existing virtual networks in the resource center; and causing the media content to be transcoded by the one or more compute instances of the at least one virtual network.

9. The computer implemented method of claim 7, further comprising:

monitoring the one or more compute instances of the virtual private network to determine state information; and detecting that the one or more compute instances is not copying or storing the media content in the first format or second format based at least in part on the state information.

10. A non-transitory computer readable storage medium storing one or more sequences of instructions executable by one or more processors to perform a set of operations comprising:

obtaining a request to transcode media content stored in a resource center;

determining, by a computer system, a prediction of transcoding for compute instances based at least in part on a history of requests for processing the media content;

identifying the compute instances to match the prediction of processing, the compute instances configured to process the media content into one or more formats; and causing the media content to be processed from a first format into a second format by the compute instances in the resource center, the second format determined based at least in part on the prediction of processing and the compute instances identified.

11. The non-transitory computer readable storage medium of claim 10, the set of operations further comprising:

causing, by the computer system, a virtual machine image to be stored on the resource center, the virtual machine image including at least an operating system and information for configuring the one or more compute instances; and initiating the one or more compute instances to access the media content stored in the resource center based at least in part on the virtual machine image and the prediction of processing.

12. The non-transitory computer readable storage medium of claim 11, the set of operations further comprising:

obtaining performance data associated with at least one processing algorithm processing the media content, the performance data including comparing the second format to the first format;

determining error information based at least in part on comparing the second format to the first format; and updating the processing rating based at least in part on the error information and the performance data.

13. The non-transitory computer readable storage medium of claim 12, the set of operations further comprising:

identifying a provider associated with the at least one processing algorithm; and computing an account modification associated with processing the media content.

14. The non-transitory computer readable storage medium of claim 13, the set of operations further comprising:

monitoring the compute instances to detect whether the processing algorithm is malfunctioning or performing unintended actions.

15. The non-transitory computer readable storage medium of claim 10, the set of operations further comprising:

metering the content processed from the first format to the second format;

determining an amount of resources on the virtual machine used to process the content based on the metering.

16. A computing system, comprising:

at least one processor; and memory including instructions that, when executed by the processor, cause the computing system to:

obtain a request to transcode media content stored in a resource center;

determine, by a computer system, a prediction of processing for a virtual machine based at least in part on a history of requests for processing the media content;

identify the virtual machine to match the prediction of processing, the virtual machine configured to process the media content into one or more formats;

cause, by the computer system, a virtual machine image to be stored on the resource center, the virtual machine image including at least an operating system and information for configuring the virtual machine;

initiate the virtual machine to access the media content stored in the resource center based at least in part on the virtual machine image; and cause the media content to be processed, using a processing algorithm, from a first format into a second format by the virtual machine in the resource center, the second format determined based at least in part on the prediction of processing, the processing algorithm, and the virtual machine.

17. The computing system of claim 16, further comprising instructions that cause the computing system to:

provision the virtual machine identified;

restrict access between the virtual machine and external entities that reside outside of the network that includes the virtual machine, the external entities including the computing system; and provide the media content to the virtual machine.

18. The computing system of claim 16, further comprising instructions that cause the computing system to:

determine account modification associated with the processing algorithm based at least in part on a processing rating; and transmit the account modification associated with the processing algorithm.

19. The computing system of claim 16, wherein the processing algorithm processes the content by at least one of:

transcoding the content, performing image recognition on the content, transmuxing the content, digital watermarking the content, segmenting the content, applying access controls on the content, adding meta data to the content, inserting advertisements into the content, translating the content into one or more languages, transcribing the content, changing bit rates of the content, sequencing the content, changing or adding audio associated with the content, data mining the content, or analyzing the content.

20. The computing system of claim 16, further comprising instructions that cause the computing system to:

identify a provider associated with the processing algorithm; and compute an account modification associated with processing the media content.

* * * * *